(12) United States Patent
Wegmann et al.

(10) Patent No.: US 6,224,636 B1
(45) Date of Patent: May 1, 2001

(54) SPEECH RECOGNITION USING NONPARAMETRIC SPEECH MODELS

(75) Inventors: Steven A. Wegmann, Cambridge; Laurence S. Gillick, Newton, both of MA (US)

(73) Assignee: Dragon Systems, Inc., Newton, MA (US)

(*) Notice: Subject to any disclaimer, the term of this patent is extended or adjusted under 35 U.S.C. 154(b) by 277 days.

(21) Appl. No.: 08/807,430

(22) Filed: Feb. 28, 1997

(51) Int. Cl.[7] .................................................. G10L 15/06
(52) U.S. Cl. ......................... 764/246; 704/251; 704/255
(58) Field of Search .................................. 704/243, 244, 704/245, 246, 251, 255, 256, 241

(56) References Cited

U.S. PATENT DOCUMENTS

| | | | |
|---|---|---|---|
| 4,773,093 | * 9/1988 | Higgins et al. | 704/247 |
| 4,799,262 | 1/1989 | Feldman et al. . | |
| 4,803,729 | * 2/1989 | Baker | 704/241 |
| 4,820,059 | 4/1989 | Miller et al. . | |
| 4,837,831 | 6/1989 | Gillick et al. . | |
| 4,876,720 | 10/1989 | Kaneko et al. . | |
| 4,980,918 | 12/1990 | Bahl et al. . | |
| 5,033,087 | 7/1991 | Bahl et al. . | |
| 5,182,773 | 1/1993 | Bahl et al. . | |
| 5,271,088 | * 12/1993 | Bahler | 704/200 |
| 5,526,463 | * 6/1996 | Gillick et al. | 704/251 |
| 5,715,367 | * 2/1998 | Gillick et al. | 704/254 |

OTHER PUBLICATIONS

Bahler et al., "Improved Voice Identification Using a Nearest–Neighbor Distance Measure," IEEE (1994), pp. I–321—I–323.
Higgins et al., "Voice Identification Using Nearest–Neighbor Distance Measure,", IEEE (1993), pp. II–375—II–378.
Bahl, Lalit, "A Maximum Likelihood Approach to Continuous Speech Recognition," IEEE Transactions on Pattern Analysis and Machine Intelligence, vol. PAMI–5, No. 2 (Mar. 1983), pp. 179–190.
Bahl, L.R., "Interpolation of Estimators Derived from Sparse Data," IBM Technical Disclosure Bulletin, vol. 24, No. 4 (Sep. 1981), pp. 2038–2041.
Bahl, L.R. et al., "Obtaining Candidate Words by Polling in a Large Vocabulary Speech Recognition System," IEEE (1988), pp. 489–492.
L.R. Bahl, et al.; "Constructing Candidate Word Lists Using Acoustically Similar Word Groups"; IEEE Transactions on Signal Processing vol. 40, No. 11; Nov. 1992 (USA).
K. Ganesan, et al.; "An Efficient Algorithm for Combining Vector Quantization and Stochastic Modeling for Speaker–Independent Speech Recognition"; ICASSP 86, pp. 1069–1071; Apr. 1986 (Japan).
D. Scott; "Classification Using Multivariate Nonparametric Density Estimation"; Proceedings of the 6th Ann. Conference and Exposition; Computer Graphics vol. III, pp. 715–718 (USA).
D. Lubensky; "Word Recognition Using Neural Nets, Multi–State Gaussian and K–Nearest Neighbor Classifiers"; Speech Processing 1, Conference 16; pp. 141–144; May 1991 (Canada).
R. Roth; "Large Vocabulary Continuous Speech Recognition of Wall Steet Journal Data"; Speech Processing, vol. 2, pp. II–640–643; Apr. 1993 (USA).

* cited by examiner

Primary Examiner—David Hudspeth
Assistant Examiner—Susan Wieland
(74) Attorney, Agent, or Firm—Fish & Richardson P.C.

(57) ABSTRACT

The content of a speech sample is recognized using a computer system by evaluating the speech sample against a nonparametric set of training observations, for example, utterances from one or more human speakers. The content of the speech sample is recognized based on the evaluation results. The speech recognition process also may rely on a comparison between the speech sample and a parametric model of the training observations.

24 Claims, 9 Drawing Sheets

SPEECH RECOGNITION USING NONPARAMETRIC SPEECH MODELS

STATEMENT AS TO FEDERALLY SPONSORED RESEARCH

The government may have certain rights in this invention.

BACKGROUND

The invention relates to speech recognition.

Speech recognition systems analyze a person's speech to determine what the person said. In a typical frame-based speech recognition system, a processor divides a signal derived from the speech into a series of digital frames, each of which corresponds to a small time increment of the speech. The processor then compares the digital frames to a set of speech models. Each speech model may represent how a word is spoken by a variety of speakers. Speech models also may represent phonemes that correspond to portions of words. Phonemes may be subdivided further within the speech model into phoneme elements (PELs), also known as phoneme nodes. Collectively, the constituent phonemes for a word represent the phonetic spelling of the word.

The processor determines what the speaker said by finding the speech models that best match the digital frames that represent the person's speech. Speech recognition is discussed in U.S. Pat. No. 4,805,218, entitled "METHOD FOR SPEECH ANALYSIS AND SPEECH RECOGNITION," which is incorporated by reference.

SUMMARY

In one aspect, generally, the invention features evaluating a speech sample by collecting training observations, partitioning the training observations into groups of related training observations, and assessing a degree to which the speech sample resembles a group of training observations. Prior to receiving a speech sample, utterances may be collected from one or more speakers and the training observations may be collected from the utterances.

For each group of training observations, distances between data points representing the speech sample and the training observations may be determined. A degree to which a group of training observations resembles the speech sample may be based on a proximity between the group of training observations and the speech sample.

The assessment of the speech sample may include applying a variable bandwidth kernel density estimator function— for example, a k-th nearest neighbor density function— derived from the training observations to the speech sample.

In a two-pass embodiment, a speech model—for example, a statistical representation—may be established from the training observations and compared against the speech sample. The speech sample may be assessed as resembling a group of training observations based on (i) a result of the comparison of the speech sample against the speech model (first pass) and (ii) a result of the assessment of the speech sample against the group of training observations (second pass). Speech recognition may be accomplished by applying weighting factors to the training observation evaluation result and to the model comparison result.

In a three-pass embodiment, the speech sample may be reevaluated (third pass) against the speech model following the first and second passes described above. In that case, speech recognition may be based on the model comparison result (first pass), the training observation evaluation result (second pass), and the reevaluation result (third pass).

In another aspect, the invention generally features recognizing a speech sample by establishing a speech model (for example, a parametric model or other statistical representation) from training observations and identifying a portion of the speech model based on a comparison of the speech sample with the speech model. The speech sample then is evaluated against a subset of the training observations that corresponds to the identified portion of the speech model. The speech sample's content is recognized based on a result of the evaluation.

In one embodiment, the speech sample is divided into a series of frames, each frame is compared against each portion (e.g., phoneme element) of the speech model, and a score is assigned to each portion of the speech model for each frame. A determination that a portion of the speech model is to be identified may be made if that portion's score exceeds a threshold value. The training observations that correspond to each identified portion of the speech model may be compared against each frame of the speech sample. Based on this comparison, the score for each identified portion may be modified—for example, by smoothing with a weighting factor to produce a smoothed score. The content of the speech sample is recognized as corresponding or not to the identified portion based on the modified score.

In another aspect, a speech recognition system includes an input device configured to receive a speech sample to be recognized, a nonparametric acoustic model comprising utterances from one or more human speakers, and a processor coupled to the input device and to the nonparametric acoustic model. The processor is configured to evaluate the speech sample against the nonparametric acoustic model. The speech recognition system may also include a parametric acoustic model which comprises a statistical representation of the utterances. In that case, the speech sample also is evaluated by the processor against the parametric acoustic model.

In another aspect, the invention generally features a computer program, residing on a computer readable medium, for a speech recognition system which includes a processor and an input device. The computer program includes instructions to receive, via the input device, a speech sample to be recognized and evaluate the speech sample against a nonparametric speech model. The content of the speech sample is recognized based on a result of the evaluation.

In a two-pass embodiment, the computer program includes further instructions to evaluate the speech sample against a parametric speech model and to recognize the content of the speech model based on a result of the parametric evaluation (first pass) and on the result of the nonparametric evaluation (second pass). The parametric evaluation may be performed either before or after the nonparametric evaluation or both before and after the nonparametric evaluation (e.g., in a three-pass embodiment). The parametric evaluation may include instructions to identify a subset of the nonparametric speech model against which the speech sample is to be compared during the nonparametric evaluation. The nonparametric evaluation may include instructions to compare the speech sample against a portion of the nonparametric speech model based on the result of the parametric evaluation, for example, based on the subset of the nonparametric speech model identified during the parametric evaluation.

Advantages of this invention may include one or more of the following. Speech may be recognized with nonparametric recognition techniques to reduce the recognition error rate. Speech samples to be recognized may be compared against actual training observations (e.g., utterances from human speakers) rather than against a crude statistical approximation of the training observations -- i.e., a parametric model. This allows the speech sample to be analyzed in a manner that takes advantage of fine structures present in the training observations.

Further, speech may be recognized by combining parametric and nonparametric processes in a multiple pass manner to achieve more accurate results without sacrificing the timeliness of a recognition result. By using a parametric recognition process to narrow the universe of speech model units against which a speech sample is to be compared, the processing time for recognition is kept within acceptable limits. At the same time, by using a nonparametric recognition process, a rich body of speech model data may be used to enhance the accuracy of the speech recognition process.

Other features and advantages will become apparent from the following description, including the drawings and the claims.

DETAILED DESCRIPTION

A speech recognition system typically requires a large volume of training data (i.e., samples of utterances from one or more speakers) against which input speech may be compared and evaluated. The volume of training data typically needed, however, is so large that the processing time delays incurred in comparing the input speech against each training data point (i.e., each sample from a speaker) could be regarded as unacceptable. The large volume of training data also tends to require enormous data storage and retrieval processing. Consequently, conventional speech recognition systems are parametric—that is, speech recognition is performed by evaluating input speech samples against an abstraction (e.g., function, density distribution) that models the training data rather than by evaluating the speech samples directly against individual training data points. Parametric speech recognition reduces processing burdens and makes the speech recognition calculations more manageable.

In speaker-independent speech recognition systems, the speech models used must allow for a wide degree of variability in the way a given word can be pronounced by many different speakers. This tends to result in fuzzy, or poorly defined, word models, which produces recognition errors. Fuzziness also exists, typically to a lesser degree, in speaker-dependent speech models due to the inherent variability of the speech models and of speech itself.

Due to the inherent complexities of speech recognition, observations (both the training samples and the input samples to be recognized) typically are made, and recognition calculations are performed, in 24-dimensional acoustic space—a huge logical universe. The majority of observations, however, tend to "live" in just 5–7 of those dimensions. That is, with respect to an arbitrarily small region surrounding a given observation data point within the acoustic space, the data defining most related observations only vary significantly in about 5–7 of the 24 dimensions. Within that region, the data defining the remaining 17–19 dimensions remain fairly constant between observations. As a result, the significant majority of the 24-dimensional acoustic space contains data that produces no meaningful results when processed. In other words, parametric models are relatively coarse.

Due to their coarseness, large parametric models do not capture the fine structures defined by the underlying training data. For example, if the observation data defined a hollow sphere in three-dimensional space, and if a parametric model was generated from this observation data by taking the arithmetic mean of the respective spatial locations of the data, the parametric model would appear as a single point in space located at the origin of the sphere defined by the observation data. Potentially valuable information relating to certain of the sphere's characteristics (e.g., its radius) effectively would be lost in the model. Moreover, because no point in this example training data set is a point at the origin, the parametric model effectively creates from the training data an artifact that could induce errors in operations performed on the model.

Adding more information to the parametric model might not necessarily reduce its coarseness to any meaningful degree. For example, if the parametric model in the above example were constructed with standard deviation or variance information in addition to arithmetic mean information, the data points defining the hollow sphere would be modeled as falling anywhere within the sphere or in the vicinity of the sphere's surface. The information that the data points defining the sphere all were located precisely at the sphere's radius still would be lost.

Similar to the above example, acoustic parametric models typically are implemented as statistical approximations of their underlying training data and thus lose much potentially useful information present in the training data. As a result, the use of parametric acoustic models necessarily increases the recognition error rate and prevents the opportunity for complex, and potentially useful, analysis of the training data.

Figure 1:
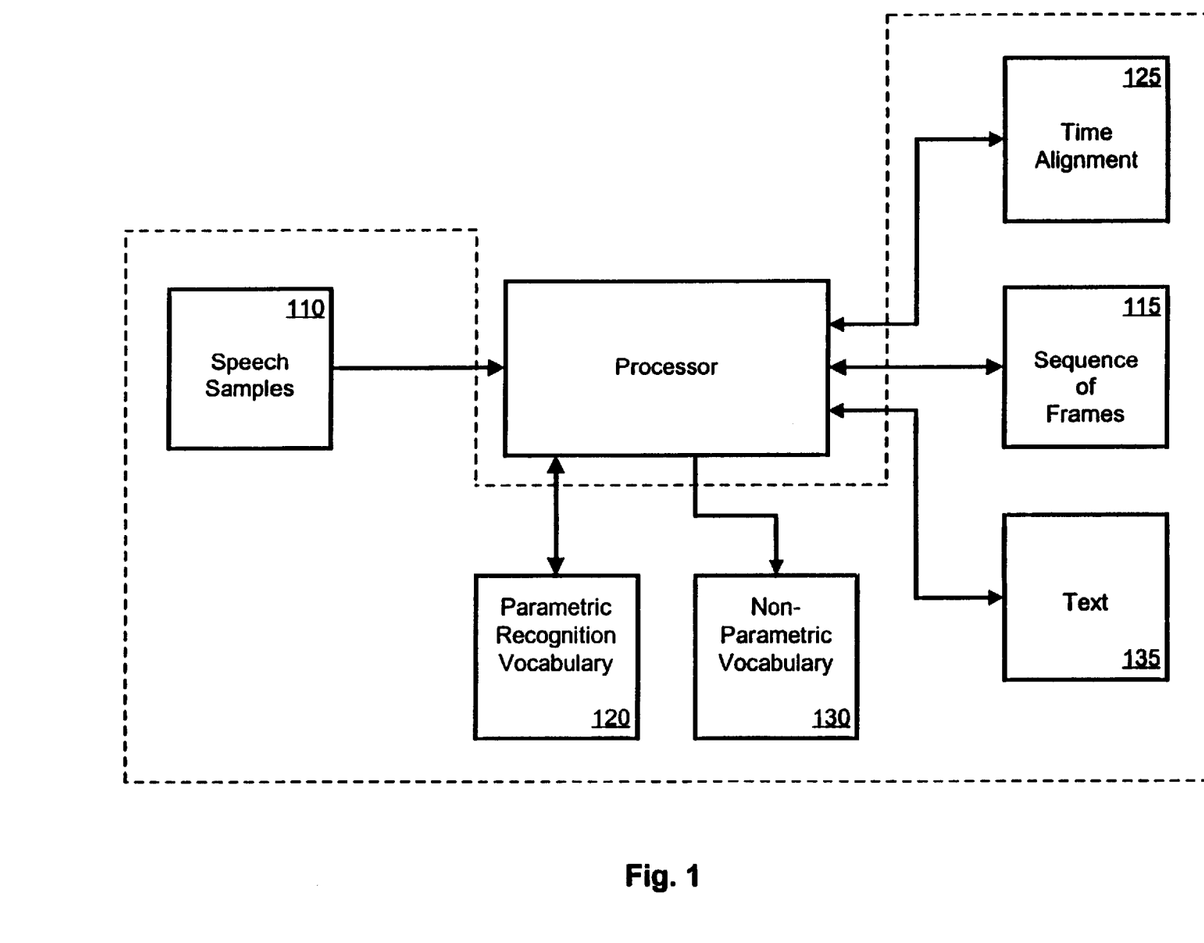
FIG. 1 is a block diagram of a speech recognition system.

The speech recognition system shown in FIG. 1 effectively performs speech recognition in a two-pass manner. In the first pass, an input speech sample is analyzed using parametric speech recognition techniques to identify a subset of speech units (e.g., phoneme nodes) to which the input speech sample likely corresponds. The first pass significantly reduces the domain of speech units that potentially match the input speech sample and thus reduces the processing time that will be needed to perform the second pass.

An implementation of parametric speech recognition techniques that may be used for the first pass are discussed in more detail in U.S. application Ser. No. 08/701,393, entitled "LEXICAL TREE PRE-FILTERING IN SPEECH RECOGNITION" and filed Aug. 22, 1996; and U.S. application Ser. No. 08/804,061, entitled "SPEAKER IDENTI- FICATION USING UNSUPERVISED SPEECH MODELS" and filed Feb. 21, 1997, both of which are incorporated by reference. In general, a speech recognition procedure is used to determine what a person has said by comparing the digital frames representing the person's speech to speech models from a vocabulary. The procedure maintains several hypotheses about what the person may have said. With each additional frame of the person's speech, the procedure attempts to extend each hypothesis. Scores are maintained for each hypothesis and updated based on the degree to which a parametric acoustic model of a component (e.g., a word or phoneme) of the hypothesis matches each frame of the person's speech.

In the second pass, the input speech sample is further evaluated against the subset of speech units identified in the first pass to identify the actual words that correspond to the input speech sample. The second pass is a nonparametric speech recognition process, in which the input speech sample is compared against the actual training observations from which the parametric speech model used in the first pass was constructed. Thus, the second pass tends to produce more accurate recognition results because data descriptive of actual utterances is used in the recognition calculus rather than statistical approximations of that data.

The speech recognition system 100 shown in FIG. 1 includes a processor 105 that identifies the content of an unknown speech sample 110 by performing speech recognition processes. The processor 105 analyzes the sample 110 for an utterance to produce a sequence of frames 115 (e.g., packets of digital data), each of which corresponds to a short portion (e.g., 10 milliseconds) of the sample 110. Each frame in the sequence of frames 115 includes a set of parameters that collectively represent the frequency content of the frame over time (i.e., the energy of the frame in different frequency bands). The frames, in turn, collectively represent the frequency content of the sample 110 over time.

The processor compares the sequence of frames 115 for an utterance to a parametric acoustic model of a recognition vocabulary 120 to identify one or more speech units (e.g., words, phonemes, PELs) that are likely to correspond to each frame of the sample 110. As noted above, the parametric acoustic model is an abstraction that is representative of a group of spoken utterances. It does not contain data directly descriptive of actual utterances but rather it reflects generalities about a body of training observations as a whole.

Figure 2A:
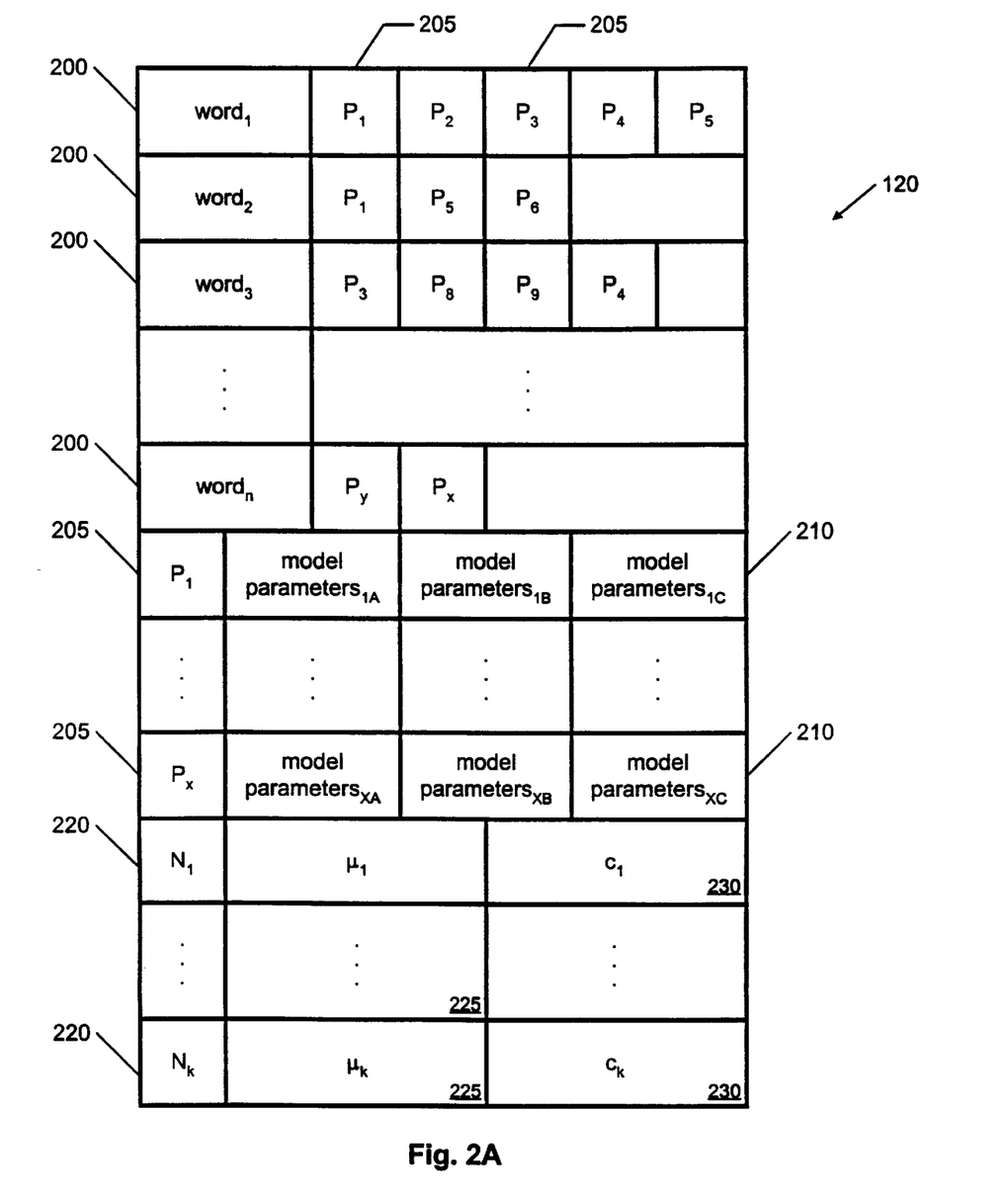
FIGS. 2A and 2B are a data structure for a recognition vocabulary including a parametric acoustic model.
Figure 2B:
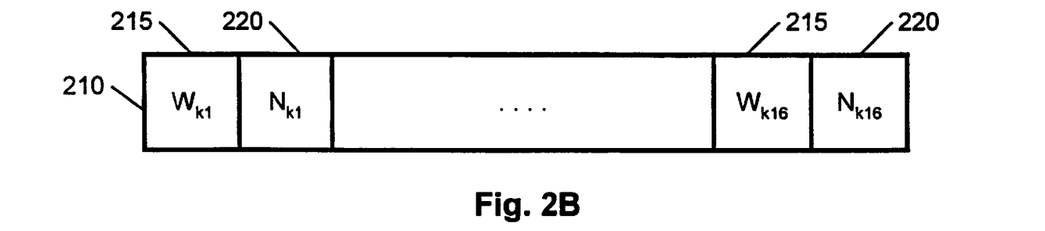

As shown in FIG. 2A, the recognition vocabulary 120 represents words 200 using a pronunciation model in which each word 200 is represented by a series of phonemes 205, and in which a parametric acoustic model for each phoneme 205 typically includes three nodes 210, one for each of the constituent PELs that define the phoneme. As shown in FIG. 2B, the parametric acoustic model for each phoneme node 210 is composed of parameters that represent the frequency content typically associated with the phoneme node. Parameter types may include frequency parameters and cepstral parameters, as well as signals derived from the frequency parameters and cepstral parameters. Frequency parameters represent the content of the speech at each of a set of frequency bands and are generated using a fast fourier transform (FFT). Cepstral parameters are generated by performing an inverse cosine transformation on logarithms of the frequency parameters. Cepstral parameters have been found to emphasize information important to speech recognition more effectively than frequency parameters. The processor may combine the cepstral parameters using an IMELDA linear combination transformation or a similar technique.

In the implementation shown in FIG. 2B, each node 210 is represented as a mixture of Gaussian probability density functions. For example, the node "i" of a phoneme "P" may be represented as $P_i$:

$$P_i = \sum_k w_k N(\mu_k, c_k),$$

where each $w_k$ is a mixture weight, $$\sum_k w_k = 1,$$

$\mu_k$ is a mean vector for the probability density function ("PDF") $N_k$, and $c_k$ is the covariance vector for the PDF $N_k$. Each phoneme node may be represented as a mixture of up to sixteen different PDFs.

The vectors $\mu_k$ and $c_k$ each include twenty four parameters. The parameters are generated by processing a large number of utterances (e.g., tens of thousands) spoken either by many different people (in a speaker-independent speech recognition system) or by a single person (in a speaker-dependent speech recognition system). These raw utterances are operated on using an IMELDA transformation to select the 24 most useful parameters from a set of 44 parameters that includes eight spectral parameters, twelve cepstral parameters, twelve cepstral differences (i.e., the differences between cepstral parameters in successive frames) and twelve cepstral second differences (i.e., the differences between cepstral differences in successive frames). A more detailed description of how parametric speech models are generated is provided in U.S. Pat. No. 5,027,406, entitled "METHOD FOR INTERACTIVE SPEECH RECOGNITION AND TRAINING," which is incorporated by reference.

A particular PDF may be used in the representation of multiple phoneme nodes. Accordingly, the parametric acoustic model of the recognition vocabulary 120 represents each phoneme node 210 as a collection of mixture weights $w_k$ 215 associated with up to sixteen different PDFs $N_k$ 220. As shown in FIG. 2A, the acoustic model separately represents each PDF $N_k$ 220 using a mean vector $\mu_k$ 225 and a covariance vector $c_k$ 230. Each component of the mean vector $\mu_k$ 225 represents the mean value of that component for the collection of utterances used in generating the PDF. Each component of the covariance vector $c_k$ 230 represents the variance between values of that component for the collection of utterances used in generating the PDF.

Referring again to FIG. 1, in comparing the sequence of frames 115 to the parametric acoustic model of the recognition vocabulary 120, the processor 105 uses dynamic programming techniques to identify the speech units to which the frames 115 most likely correspond. An example of dynamic programming techniques used in connection with speech recognition is disclosed in U.S. Pat. No. 4,783,803, which is incorporated by reference. Using these or other dynamic programming techniques, the processor produces a table 125 that relates each frame 115 to a set of likely phoneme nodes. This set of likely phoneme nodes represents a subset of all the phoneme nodes in the parametric acoustic model of the recognition vocabulary 120.

After generating the table 125, the processor compares the sets of likely phoneme nodes to a nonparametric acoustic model 130 to identify the text 135 that corresponds to the sample 110. In contrast to the parametric acoustic model of the recognition vocabulary 120, which is an abstract representation of a group of utterances as a whole, the nonparametric acoustic model 130 corresponds to the individual training observations themselves. The nonparametric acoustic model 130 is a data structure of pointers to the raw training observations that were used in generating the parametric acoustic model of the vocabulary 120.

The speech sample 110, the sequence of frames 115, the recognition vocabulary 120, the table 125, the nonparametric acoustic model 130, and the text 135 may be stored in a storage device 140, such as a memory or a hard drive, associated with the processor 105.

Figure 3:
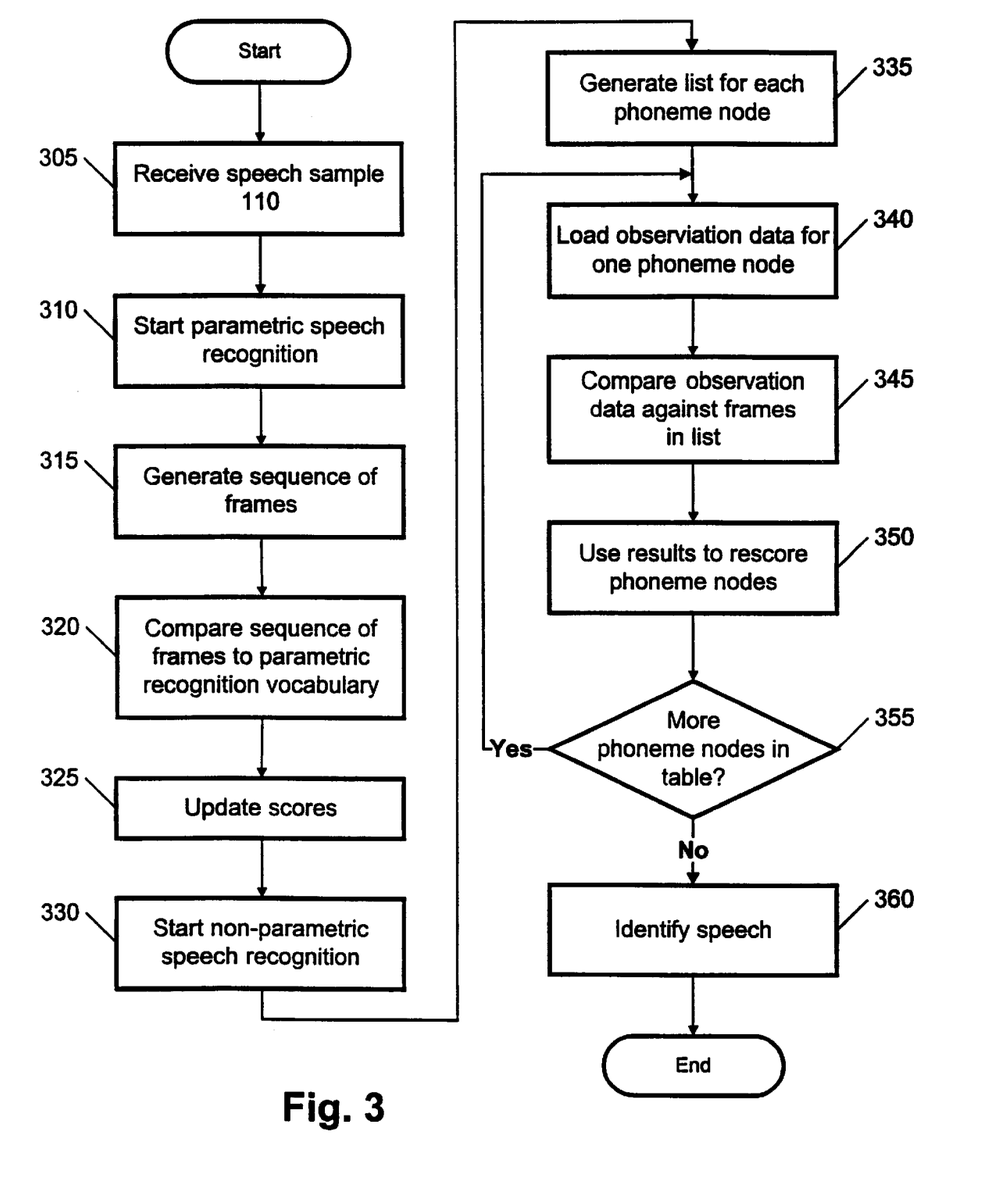
FIG. 3 is a flow chart of a procedure performed by the speech recognition system of FIG. 1.
Figure 4:
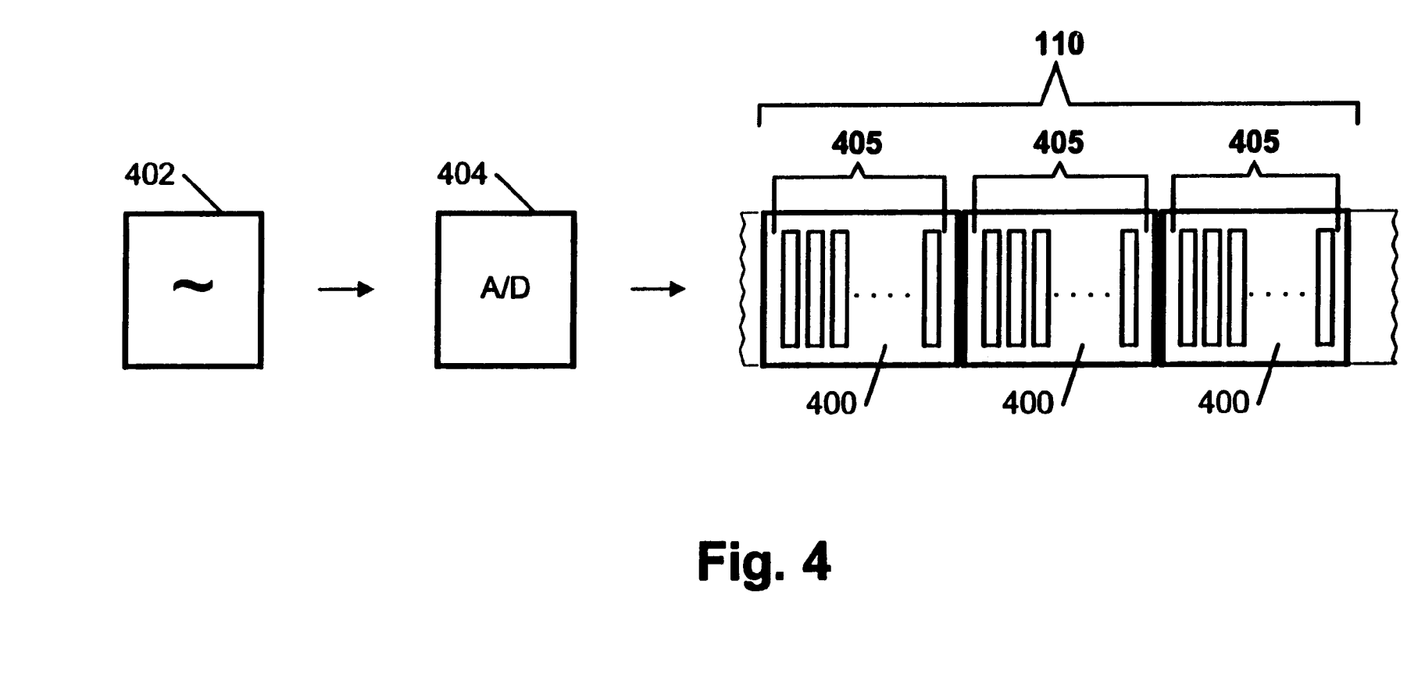
FIG. 4 shows the conversion of an analog speech sample into a set of digital frames.

A more detailed explanation of the speech recognition procedure performed by processor 105 is provided with reference to the flowchart of FIG. 3. Speech recognition procedure 300 begins upon receiving an input speech sample 110 (step 305). As shown in FIG. 4, the speech sample 110 received by processor 105 is a set of digital frames 400 produced by periodically sampling an analog signal 402 that corresponds to the speech to be recognized. The periodic sampling is performed with an analog-to-digital (A/D) converter 404 which produces a set of samples 405 for each frame. The particular sampling values used will determine the characteristics of the speech sample 110. For example, the digital signal could be produced using a frame length of 10 milliseconds and a sampling rate of about 8 kHz so that the digital signal would include 80 digital samples 405 in each frame 400.

Next, processor 105 performs parametric speech recognition (the first pass) on the speech sample 110 (steps 310–320) to identify a set of likely phoneme nodes against which the speech sample should be evaluated further in the nonparametric speech recognition process (the second pass). A detailed discussion of parametric speech recognition techniques is provided in U.S. Pat. No. 4,805,218, entitled "METHOD FOR SPEECH ANALYSIS AND SPEECH RECOGNITION," which is incorporated by reference.

The speech recognition performed in steps 310–320 is "continuous" meaning that the processor can recognize the words regardless of whether or not pauses exist between the words. Consequently, speakers need not pause between words when using continuous speech recognition systems. A more detailed description of continuous speech recognition is provided in U.S. Pat. No. 5,202,952, entitled "LARGE-VOCABULARY CONTINUOUS SPEECH PREFILTERING AND PROCESSING SYSTEM," which is incorporated by reference.

Figure 5:
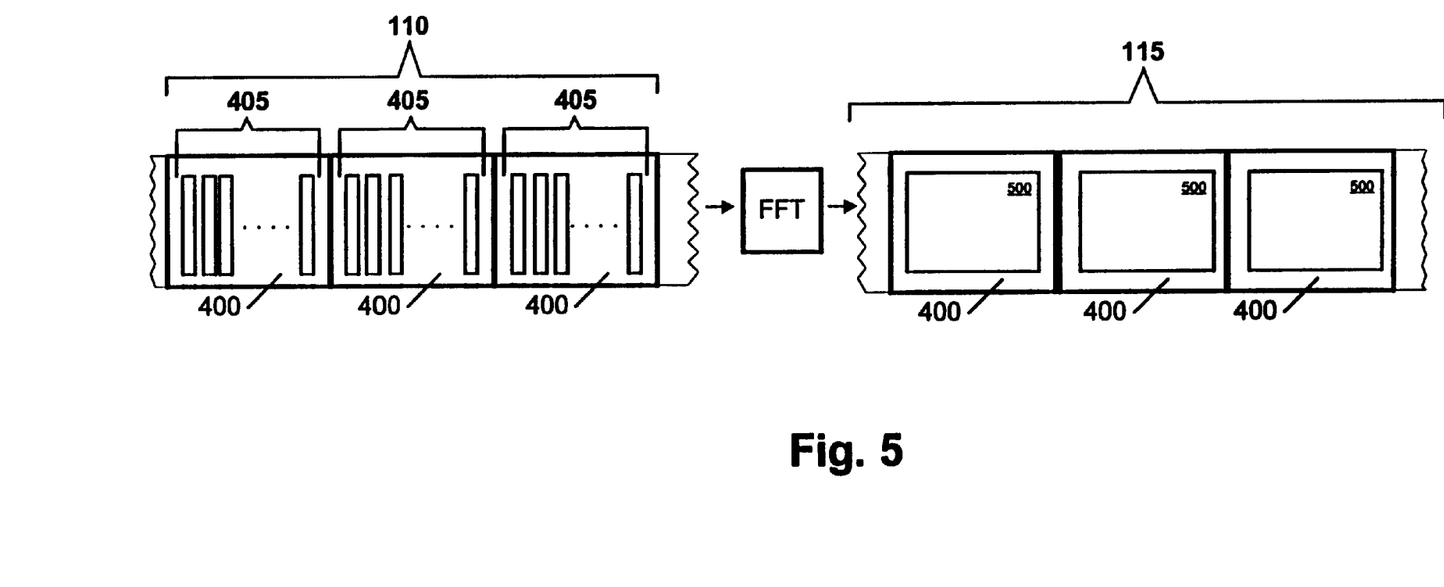
FIG. 5 shows the conversion of sampled speech data into frequency parameter data.

In performing parametric speech recognition in steps 310–320, the processor first performs FFT operations on the speech sample 110 to produce a sequence of frames 115 (step 315). As shown in FIG. 5, each frame 400 of the sequence of frames 115 includes a set of parameters 500 that represent the frequency content of the frame (i.e., the energy of the frames in different frequency bands). As noted above, in one implementation, the set of parameters includes 24 parameters selected from a set of 44 parameters (8 spectral parameters, 12 cepstral parameters, 12 cepstral differences and 12 cepstral second differences) using an IMELDA transform.

Processor 105 identifies the set of phoneme nodes to which the sequence of frames 115 most likely corresponds by comparing the sequence of frames 115 to the parametric acoustic model of the recognition vocabulary 120 shown in FIGS. 2A and 2B (step 320). More specifically, the parameters 500 in the sequence of frames 115 (FIG. 5) are compared to the parameters representing each phoneme node 210 in the parametric acoustic model of the recognition vocabulary 120 (FIG. 2) to find a series of frames 500 from the sequence of frames 115 that correspond to phoneme nodes 210 in the parametric acoustic model.

The processor uses the comparison results to update a running score that is maintained for each phoneme node of an active hypothesis and which indicates the likelihood that the phoneme node matches a particular frame (step 325). For ease of processing, scores are maintained as negative logarithmic values. Accordingly, a lower score indicates a better match (a high probability) while a higher score indicates a less likely match (a lower probability), with the likelihood of the match decreasing as the score increases.

Figure 6:
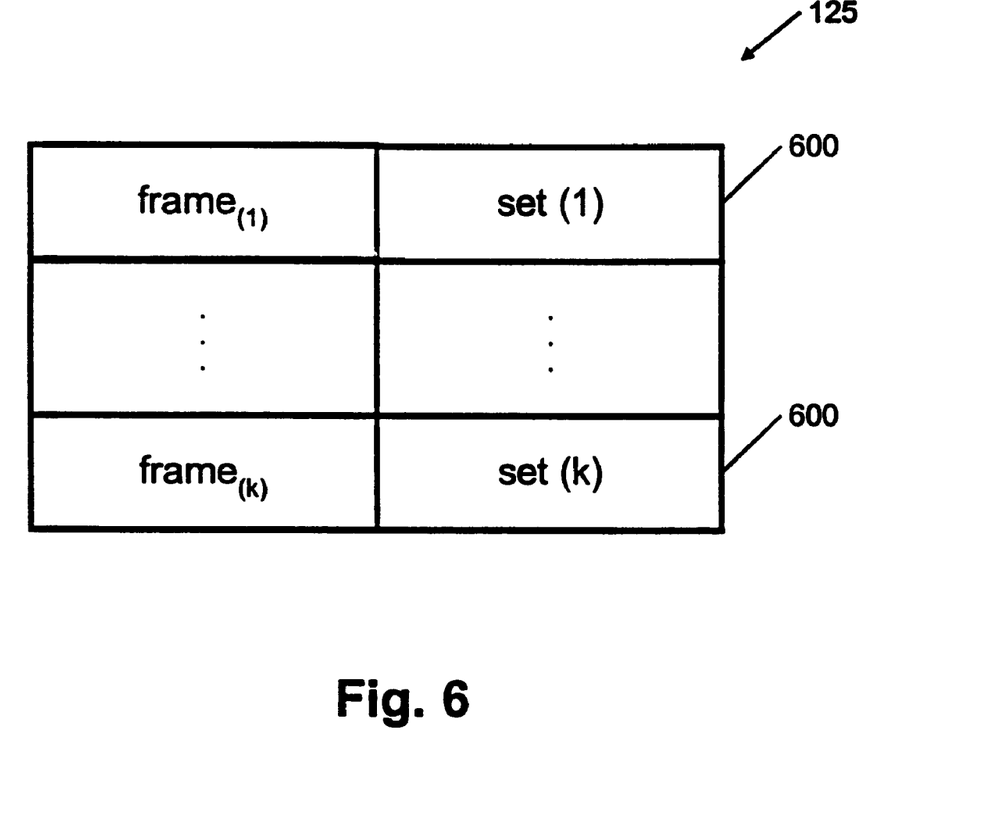
FIG. 6 shows a table of frames of frequency data correlated with sets of phoneme nodes.

Based on the results of comparing the sequence of frames 115 to the parametric acoustic model of the recognition vocabulary 120, the processor uses dynamic programming techniques to generate a table that relates each frame 400 in the sequence of frames 115 to a set 600 of one or more likely phoneme nodes 210 as shown in FIG. 6. A score, referred to as a parametric score, is associated with each phoneme node.

Three general approaches have been considered for generating the parametric scores and producing the table. In a first approach, the processor generates parametric scores for a ranked list of the top "n" best hypotheses for an utterance, where "n" may be, for example, a number between 100 and 1000. A phoneme node is identified as corresponding to each data frame for each hypothesis, and a score is associated with each data frame. As such, if there are "m" data frames, this approach will produce n×m node/frame pairs for nonparametric analysis.

In a second approach, the processor keeps track of which phoneme nodes were scored against each data frame, and creates the table by selecting the best scoring nodes for each frame. For example, the processor may select the nodes that score in the top 10% of all nodes scored for a frame. The percentage of nodes selected by the processor may be adjusted based on system capabilities and other factors.

In a third approach, instead of producing a list of the best-scoring hypotheses, the processor produces a word lattice that is time-aligned with the data frames at the node level. The word lattice has a single starting vertex corresponding to initial silence and a single ending vertex corresponding to final silence. Vertices in between the starting and ending vertices correspond to hypothesized words or nodes. Each word is time-aligned with the data frames at the node level. A recognition hypothesis is constructed from the lattice by starting with initial silence, picking any vertex connected to initial silence by an edge, and adding the word or node corresponding to the vertex to the hypothesis. This continues until the final silence vertex is reached, at which point the recognition hypothesis corresponds to a path through the lattice. The table for nonparametric processing may be generated from the lattice by identifying the data frames aligned with each vertex of the lattice. A discussion of word lattice techniques is provided in U.S. application Ser. No. 08/701,393, entitled "LEXICAL TREE PREFILTERING IN SPEECH RECOGNITION" and filed Aug. 22, 1996, which is incorporated by reference.

Once the table 125 of likely phoneme nodes has been generated for the speech sample 110, the first pass is complete. The table 125 is then used by the nonparametric recognition process (the second pass) to identify the words to which the speech sample 110 corresponds (steps 330–345).

Figure 7:
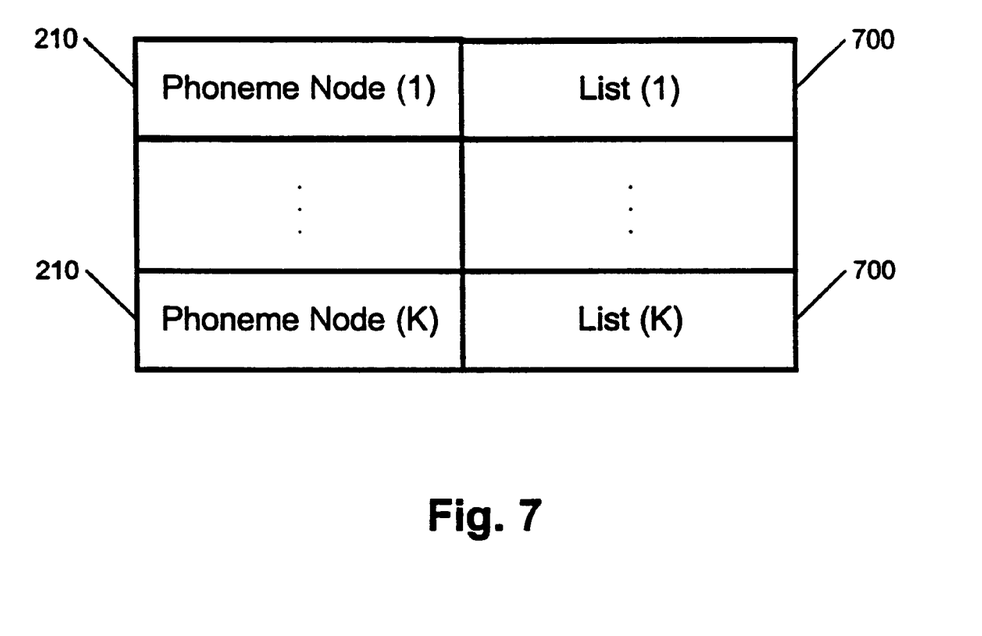
FIG. 7 shows phoneme nodes correlated with lists of frames of frequency data.

The first step in the nonparametric process is to generate a list 700 for each phoneme node in table 125 of every frame for which that phoneme node has been identified as a likely match, as shown in FIG. 7 (step 335). These lists 700 collectively contain the same information as table 125 but in a different organization—namely, lists 700 in FIG. 7 are arranged in a phoneme node dependent order whereas the rows of table 125 are arranged in a frame dependent order.

Next, the training data for the phoneme nodes included in table 125 are sequentially loaded into system memory so that they may be compared by the processor with the corresponding frames (step 340). The training data are loaded for one phoneme node at a time and each frame included in that phoneme node's list 700 is evaluated in order. Using a phoneme node dependent ordering in this manner ensures that each set of training data will be loaded only once during the nonparametric recognition process. Consequently, because the training data are considerably larger in volume than the data defining each frame, performing the nonparametric recognition processes on a phoneme node dependent basis, as opposed to a frame dependent basis, significantly reduces processing time.

After the training data for a single node have been loaded into memory, they are evaluated by the processor (step 345) using a "k-th nearest neighbor approach," such as is described in detail in "Multivariate Density Estimation: Theory, Practice, and Visualization," by David W. Scott (1992), pp. 155–57, which is incorporated by reference. The k-th nearest neighbor approach compares each frame against the training data for the phoneme node under consideration to estimate a probability that the frame matches the training data. A higher probability means that the phoneme node's training data more closely match, in 24 dimensional acoustic space, the frame's data. Conversely, a lower probability means that the phoneme node's training data less closely match the frame's data. More particularly, each frame in the speech sample defines a fixed location in the acoustic space. A frame's location is a finite distance from each of the data points forming the training data, each of which similarly defines a location in the acoustic space. Distances from the frame under consideration to each of the is data points in the training data are determined using lookup tables. For a particular data point, the squares of the differences between each component of the frame and the corresponding component from the data point are retrieved from a lookup table and summed. Thereafter, the square root of the resulting sum is retrieved from another lookup table. The use of lookup tables eliminates the need to use computationally-expensive operations, such as multiplications, logarithms and square roots, to calculate distances and thus accelerates the recognition calculations.

Once they have been determined, the distances from the frame's data to the training data are sorted into numeric order. Then, the k-th nearest distance, $R_k$, where k is a positive integer, from the frame's location to each training data point is selected from the list of sorted distances. The nonparametric score for the phoneme node relative to the frame, and thus the probability that the frame matches the phoneme node, is determined as:

$$\text{probability} = \frac{k/N}{C \cdot R_k^d}$$

where N is the number of data points in the training data for the phoneme node under consideration, C is a constant, d is the number of dimensions being used (i.e., 24), and k is a number in the range of 1 to N, inclusive. The calculated probability represents the number of training data points that likely will be contained within a specified region in the acoustic space. The specified region is defined by a radius $R_k$ originating at the frame's location and extending through all d dimensions. Depending on the calculated probability, a frame is more or less likely to correspond to the phoneme node whose training data are being evaluated.

The constant C is a predetermined value that, when is multiplied by $R_k^d$, will represent the d-dimensional region under consideration. For example, in a two-dimensional space (d equals 2), the value $\pi$ is used for C so that $C \cdot R_k^d$ becomes $\pi R^2$, which defines a two-dimensional area. The particular values of C are unimportant for the speech recognition calculus, however, because the calculated probabilities are evaluated and compared on a relative, rather than absolute, basis. Accordingly, because all calculations are performed in 24-dimensional space, C has no effect on the relative differences between the calculated probabilities and thus may be dropped from the equation.

Figure 8:
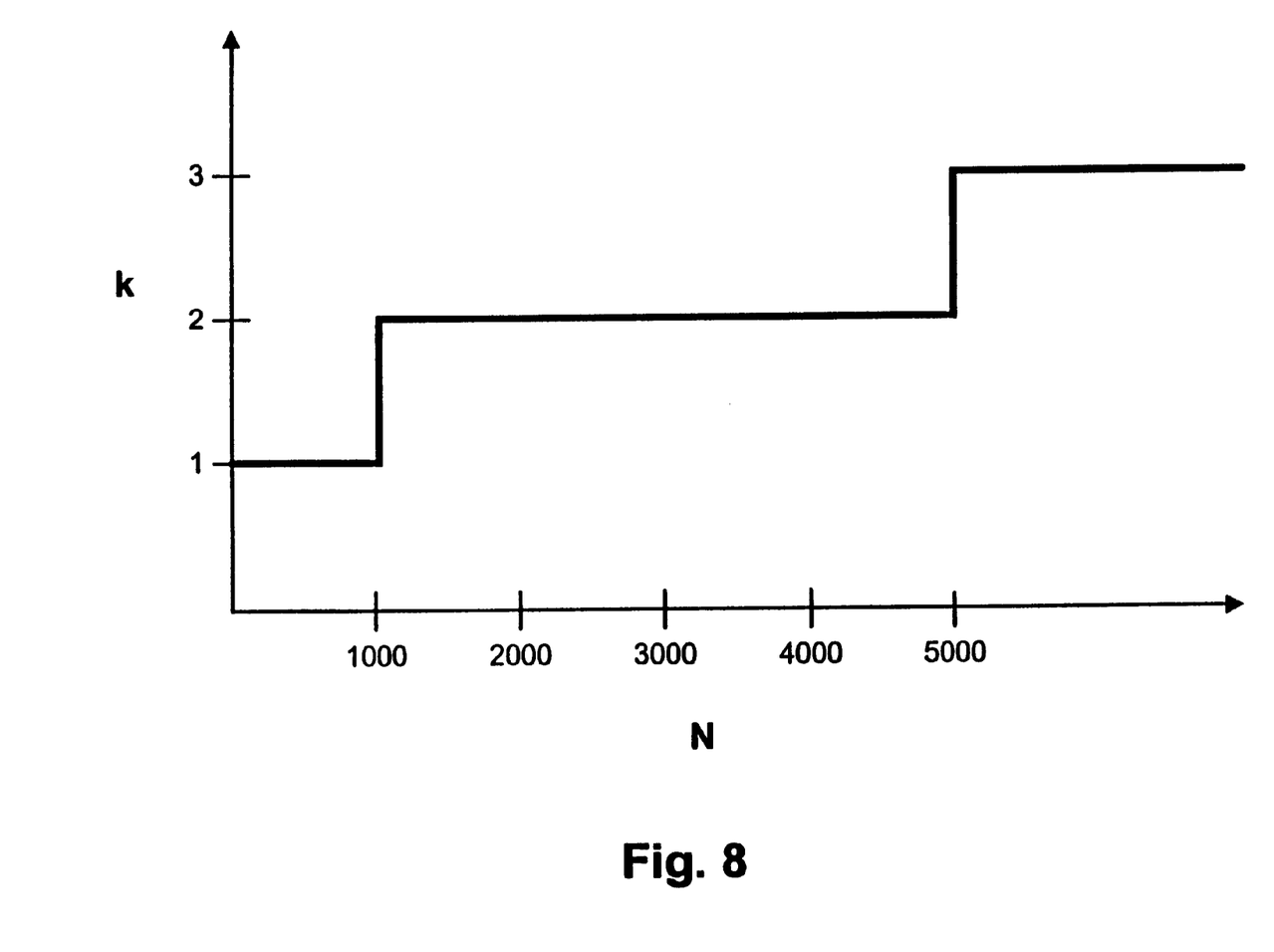
FIG. 8 is a graph of training observations versus a nearest neighbor value to be used in the speech recognition calculations.

Different values for k will yield results of varying quality. Using a value of 1 for k (i.e., calculating the probability using the nearest neighbor to the frame's location) will not necessarily produce the best results because the nearest neighbor (i.e., the training data point closest to the frame's location) may be an outlier and thus an inaccurate representative for the phoneme node. The best value of k to use for calculating the probabilities likely varies dynamically with the particular phoneme node under consideration. In general, it has been found that good values of k are represented by the graph in FIG. 8, in which k generally increases with N. Empirical observations have shown the following values of k to produce satisfactory results:

k=1 for N<1000, k=2 for 1000<N<5000, and k=3 for N>5000.

The k-th nearest neighbor approach is one type of the more general variable bandwidth kernel estimator (VBKE) function, which takes the form:

$$f(x) = \frac{1}{N} \sum_{i=1}^{N} \frac{1}{h_x^d} K\left(\frac{x - O(i)}{h_x}\right)$$

where N is the number of observations, O (i) is observation i, $h_x$ is a kernel bandwidth, d is the number of dimensions being used, and K is a kernel estimator. The general VBKE function becomes the more specific k-th nearest neighbor function by choosing K so that:

K(t)=1 for $0 \leq t \leq 1$, and

K(t)=0 for t>1, and by setting the bandwidth $h_x$ equal to $r_k$.

The results of the comparison of the frames to the training data are used to update the phoneme node scores as appropriate (step 350). In one embodiment, a smoothing operation is performed on the phoneme node scores using the following equation:

smoothed score=w·n+(1−w)·p where n is the nonparametric score calculated in steps 330–345, p is the parametric score calculated in steps 310–325, and w is a weighting factor in the range of 0 to 1, the particular value of which is determined empirically. In general, the nonparametric score n is used only to update the acoustic portion of the score for the node, and portions of the score related to a language model or to the duration of the node are not updated using parametric information. Thus, if $P_A$ represents the acoustic portion of the parametric score and $p_O$ all other portions of the parametric score, then the smoothed score may be represented as:

smoothed score=w·n+(1−w)·$P_A$+$P_O$.

After the training data for a phoneme node have been evaluated against all of the frames for which the node was identified as a likely match, the processor loads the training data for the next phoneme node in the table and repeats steps 340–355 until all of the phoneme nodes have been evaluated on a nonparametric basis.

The phoneme node scores resulting from the parametric and nonparametric recognition processes are used to identify the text 135 that corresponds to the speech sample 110 (step 360). The identification process may vary based on the approach used to generate the initial scores and the table for nonparametric analysis. For example, when the table is generated from an n-best hypotheses list, the score for each hypothesis may be recalculated based on the smoothed scores of the nodes underlying the hypothesis. Thereafter, the hypothesis having the resulting best score may be selected as the text 135.

When the table is generated based on the best scoring nodes for each frame, the recognition procedure may be rerun using the smoothed score as the acoustic portion of the score for any frame/node pair for which a smoothed score exists. During this repeat of the recognition procedure, some frame/node pairs that were not previously evaluated using nonparametric analysis may be produced. Acoustic scores for these pairs may be produced by computing parametric scores or by reusing parametric scores produced during the first pass. Alternatively, smoothed acoustic scores for these pairs may be generated using an additional iteration of nonparametric analysis. As desired, this could continue through a series of iterations until, for example, a resulting improvement in the score of the best-scoring hypothesis falls below a threshold level.

When a word lattice is employed, the word lattice may be updated using the smoothed scores. Thereafter, the text 135 may be identified as corresponding to the lowest-scoring path through the lattice.

Although the embodiment described above uses parametric speech recognition techniques in conjunction with nonparametric speech recognition techniques, speech recognition alternatively could be performed using solely nonparametric techniques. For example, the speech sample to be recognized could be compared against all available training observations rather than against a subset of the available training observations. The particular speech recognition system configuration is a matter of design choice which depends on balancing several different factors including acceptable error recognition levels, acceptable processing delays, amount of available memory, processor speed, the particular speech recognition algorithms used, and the amount of comparison data to be used in performing speech recognition.

Other embodiments are within the scope of the following claims. For example, the techniques described here are not limited to any particular hardware or software configuration; they may find applicability in any computing or processing environment that may be used for speech recognition. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and two or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A method of evaluating a speech sample using a computer, the method comprising:
   collecting training observations, each training observation representing a single utterance by a single speaker;
   partitioning the training observations into groups of related training observations;
   receiving a speech sample; and
   assessing a degree to which the speech sample resembles a group of training observations by evaluating the speech sample relative to particular training observations in the group of training observations.

2. The method of claim 1 further comprising collecting utterances from a speaker, wherein the step of collecting training observations comprises collecting training observations from the collected utterances.

3. The method of claim 2 in which the step of collecting utterances comprises sampling utterances from multiple speakers.

4. The method of claim 1 in which evaluating the speech sample comprises measuring distances between a data point representing the speech sample and data points representing particular training observations in the group of training observations.

5. The method of claim 1 in which evaluating the speech samDle comprises identifying a degree to which the group of training observations resembles the speech sample based on a proximity between particular training observations in the group of training observations and the speech sample.

6. The method of claim 1 in which evaluating the speech sample comprises applying to the speech sample a variable bandwidth kernel density estimator function derived from the group of training observations.

7. The method of claim 6 in which evaluating the speech sample comprises applying to the speech sample a k-th nearest neighbor density function derived from the training observations.

8. The method of claim 1 further comprising establishing a speech model from the training observations and comparing the speech sample with the speech model.

9. The method of claim 8 in which establishing a speech model comprises generating a statistical representation of the training observations in the form of a parametric model.

10. The method of claim 8 in which assessing comprises assessing a degree to which the speech sample resembles a group of training observations based on the evaluation relative to the training observations and on the comparison to the speech model.

11. The method of claim 10 in which the step of assessing comprises applying a weighting factor to a result of the evaluation relative to the training observations and to a result of the comparison to the speech model.

12. A computer-implemented method of recognizing content in a speech sample based on a multi-dimensional speech model derived from training observations, the method comprising:

receiving a speech sample;

identifying a portion of the speech model based on a comparison between the speech sample and the speech model;

evaluating the speech sample against particular training observations on a subset of the training observations that corresponds to the identified portion of the speech model; and recognizing a content of the speech sample based on the evaluating.

13. The method of claim 12, further comprising deriving the multi-dimensional speech model by generating a statistical representation of the training observations.

14. The method of claim 13 in which the generating comprises constructing a parametric model of the training observations.

15. The method of claim 12 in which each portion of the speech model comprises a phoneme element.

16. The method of claim 12 in which the identifying comprises:

dividing the speech sample into a series of frames;

evaluating each frame relative to each portion of the speech model;

assigning a score to each portion of the speech model for each frame; and determining that a portion of the speech model is to be identified if the score for the portion differs from a threshold value in a desired direction.

17. The method of claim 16, wherein identifying a portion of the speech sample comprises designating at least one frame as corresponding to the identified Portion, and in which the recognizing comprises for each identified portion of the speech model:

evaluating the at least one designated frame relative to each training observation for the identified portion of the speech model;

modifying the score for the identified portion based on a result of the evaluation relative to training observations; and identifying the content of the speech sample as corresponding to the identified portion based on the modified score.

18. The method of claim 17 in which the modifying comprises smoothing the score using a weighting factor.

19. A speech recognition system comprising:

an input device configured to receive a speech sample to be recognized;

a stored nonparametric vocabulary representing utterances from one or more human speakers, the vocabulary including discrete training observations, each of which represents a single utterance by a single speaker; and a processor coupled to the input device and to the nonparametric vocabulary and configured to evaluate the speech sample against the nonparametric vocabulary.

20. The speech recognition system of claim 19 further comprising parametric acoustic models which comprise statistical representations of the utterances, the speech sample also being evaluated by the processor against the parametric acoustic models.

21. A computer program, residing on a computer readable medium, for a speech recognition system comprising a processor and an input device, the computer program comprising instructions to perform the following operations:

evaluate a speech sample against a nonparametric speech model, the speech model including discrete training observations, each of which represents a single utterance by a single speaker; and recognize a speech content of the speech sample based on a result of the evaluation.

22. The computer program of claim 21 further comprising instructions to evaluate the input speech sample against a parametric speech model and to recognize the content of the input speech model also based on a result of the parametric evaluation.

23. The computer program of claim 22 in which the parametric evaluation is performed prior to the nonparametric evaluation.

24. The computer program of claim 23 in which the nonparametric evaluation comprises instructions to compare the input speech sample against a portion of the nonparametric speech model based on the result of the parametric evaluation.

* * * * *